July 15, 1969 E. B. BARCARO ET AL 3,456,250

REMOVABLE MAGNETIC DATA STORAGE SYSTEM

Filed Nov. 22, 1966 2 Sheets-Sheet 1

INVENTORS
EUGENE B. BARCARO
DONALD T. BEST

BY William E. Cleaver
ATTORNEY

INVENTORS
EUGENE B. BARCARO
DONALD T. BEST

BY William E. Clanc...
ATTORNEY 3,456,250

REMOVABLE MAGNETIC DATA STORAGE SYSTEM

Eugene B. Barcaro, Norristown, and Donald T. Best, Plymouth Meeting, Pa., assignors to Sperry Rand Corporation, New York, N.Y., a corporation of Delaware Filed Nov. 22, 1966, Ser. No. 596,134
Int. Cl. G11b 5/02
U.S. Cl. 340—174.1 12 Claims

ABSTRACT OF THE DISCLOSURE

This invention provides a fixed plated wire and drive strap array, in combination with a removable magnetizable sheet for effecting a replaceable or interchangeable magnetic memory device.

This invention relates to magnetizable data memory devices, and more particularly, to a removable or replaceable storage memory device.

STATE OF ART

In data processing systems the memory capacity is very often the determining factor in the size of the system; the internal speed of the system; and the overall value of the system. Originally, the approach was to provide more and more fixed memory positions which resulted very often in having information stored in large segments thereof which was used only relatively few times for any given number of operations by the system. Accordingly, the trend has been to provide memory read-in and read-out devices with which removable or replaceable magnetic storage elements can be used. Examples of this type of application are the well known tape handlers and the accompanying library of tapes, and the well known disc handlers and the accompanying library of magnetizable discs.

While the tape handlers and the disc handlers have provided a means by which large masses of memory can be employed without having to have a large fixed memory, these devices have had some undesirable aspects in that in order to effect a write-in and a read-out the mechanisms use a dynamic technique and therefore mechanically moving parts. It is quite apparent that whenever a data processing system employs moving parts its speeds are restricted, relatively speaking, when compared with the electronic speeds of the processors with which they are used. It is equally clear that mechanical items always introduce wear and therefore unreliability when considered over a long period of time.

SUMMARY

The present invention provides a replaceable magnetic memory. A plurality of grooved plated wires are disposed orthogonally to a plurality of drive lines. The intersection of a plated wire and a drive line defines a data storage location on a removable magnetizable sheet which is located adjacent the grooves of the plated wires. As will be explained in detail, the groove of a plated wire is analogous to a gap in an ordinary magnetic read head and by pulsing the drive lines, selectively, signals can be induced in the plated wires to read out information and write in information, from and on the removable magnetizable sheet.

The advantages of the present invention will be apparent and suggest themselves to those skilled in the art, from a reading of the following specification and claims in which:

It is generally accepted in the electronic data processing art that replaceable magnetizable data storage devices are a very valuable asset. Such devices as magnetic tapes with their accompanying tape handlers and magnetic discs with their accompanying disc handlers, have enabled systems which would be considered relatively small to be able to deal with large memory arrangements. However, it is also generally accepted in the electronic data processing art that tape handlers and disc handlers leave something to be desired in that they are dynamic devices and therefore their mechanical components are subject to wear and ultimately result in a certain amount of unreliability. In contrast the present invention provides a system which has all the advantages of replaceable magnetizable data storage elements and yet has none of the undesirable characteristics of a system with moving parts.

Figure 1:
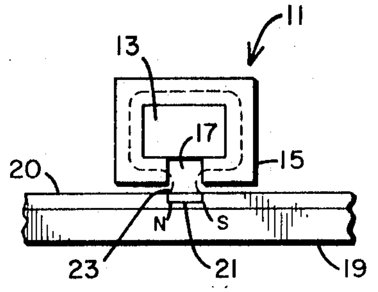
FIGURE 1 is an end view of a plated wire element shown disposed in read-write relationship to a magnetizable sheet.

In FIGURE 1 there is shown a plated wire element 11 as viewed from the end thereof. The plated wire element 11 is made up with a core 13 of copper upon which there is plated a ferro-magnetic coating. In the preferred embodiment the ferromagnetic coating is an alloy of nickel-iron in which the nickel makes up approximately 80% and the iron the remaining 20%. The plated wire 11 has a groove or channel 17 scribed or etched through the plating to the base material axially therealong. The channel 17 acts as the gap of an ordinary read-head device.

The plated wire 11 in FIG. 1 is shown to be of a rectangular configuration but it is to be clearly understood that other configurations can be used. For instance, the plated wire could have a circular cross configuration with some advantage. That is to say, a circular configuration provides a shorter magnetic path than the configuration shown in FIGURE 1. However, the present configuration has the advantage that in scribing the groove, the tolerances can be less stringent because even if the groove is off center, it will still be disposed to route the flux from an underlying dipole with a minimum of (magnetic) impedance. A high impedance would occur if the groove were placed off center on a circular wire.

Depicted in FIGURE 1, there is a magnetizable sheet 19 which has an iron oxide coating 20 thereupon, although other materials may be used provided that these materials offer a magnetizable surface. For purposes of illustration there is shown a dipole 21 in the surface 20 of the magnetizable sheet 19. Further for purposes of illustration there is shown a flux configuration 23 emanating from the dipole 21 and passing through the ferromagnetic material 15 (as depicted by the dashed line) to the other side of the dipole. Accordingly, the copper core 13 of the plated wire 11 is surrounded by a flux and if this flux is changed there will be a voltage induced therein.

Figure 2:
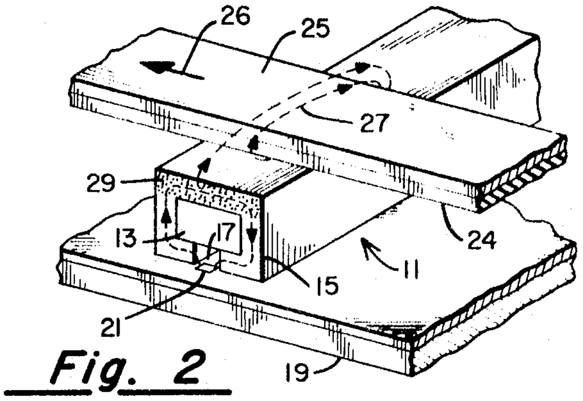
FIGURE 2 is a pictorial schematic of a plated wire element disposed between a drive strap and a magnetizable sheet.

Considering FIGURE 2 we find a plated wire element 11 having a core 13 and ferromagnetic coating 15 and a groove 17 identified with the same numbers as that in FIGURE 1. In addition, in FIGURE 2 there is depicted a drive strap 25 along which current is passed in the direction of the arrow 26. The current could be passed the other way. When current travels in the direction of the arrow 26 it provides a flux which in accordance with the right-hand rule would be disposed around the drive strap as shown by the dashed lines 27.

When the flux 27 enters the ferromagnetic material 15 the magnetization therein becomes oriented in a direction which is axial to the plated wire 11 (represented by the shaded area 29). Accordingly, the flux or magnetic vectors which lie along the circumference of the wire (as generated by the dipole and depicted by flux 23) have their paths interrupted and hence there is no complete flux path around the core 13. On the other hand, when the current along the drive strap 25 is interrupted or terminated, the vectors which lie in the area 29, revert to their circumferential orientation thereby once again linking the complete flux circuit around the ferromagnetic material and providing the $d\phi$ which is necessary in the expression $E=d\phi/dt$ in order to provide the induced voltage in the core 13.

Figure 8:
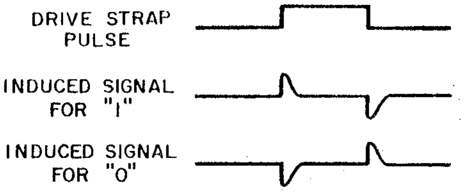
FIGURE 8 shows the waveforms of same significant signals.

In partial summary then it becomes apparent that a dipole 21 of the magnetizable sheet 19 lying under the channel 17 can be detected by passing a current along a drive strap 25 and terminating such current, thereby permitting the flux which is emanating from the dipole to complete a circuit and induce a voltage in the line 13. For a dipole of given sense of direction in the magnetic medium, the induced voltage will be of one polarity at the beginning of the word strap pulse and of the opposite polarity at the end of the word strap pulse. When the dipole has the opposite sense, both voltage polarities will be reversed. This is shown in FIGURE 8.

In FIGURE 2 there is depicted an insulation layer 24 which serves to keep the drive wire 25 electrically insulated from the plated wire 11.

The orientation of a dipole can be detected because the flux will be either in one direction or the other (zero or one direction) and thereby will induce a voltage to provide a current either in one direction or the other. The system could operate in a mode whereby only the "ones" are recorded and the "zeros" are represented by a no-recording condition.

Figure 3:
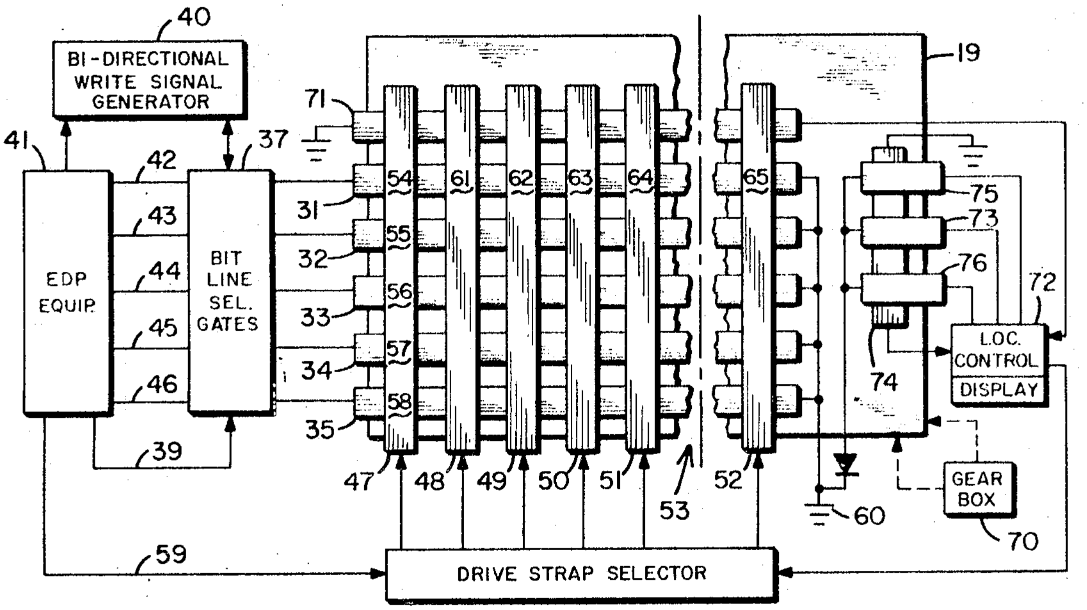
FIGURE 3 is a schematic of the overall system.

Consider now FIGURE 3 in which there are shown a plurality of plated wires 31 through 35. These plated wires are similar to the plated wire 11 shown in FIGURES 1 and 2 and have their grooves 17 oriented away from the reader and lying adjacent to the magnetizable sheet 19. The central core, such as core 13 of plated wire 11 (shown in FIGURES 1 and 2), of each of the plated wires 31 through 35 is connected to the bit line selector gates 37. These gates are respectively opened and closed in accordance with signals from the electronic data processing equipment 41. The signals from the EDP41 are transmitted over the cable 39. Within the electronic data processing equipment 41 there is provided a decoding device which acts as an address generator and selects contain of the lines of the cable 39 and hence one or more of the gates 37 can be selected. The selected gate (or gates) is in turn connected to an associated one of the plated wires 31 through 35. Accordingly, if information signals are induced in the plated wires 31 through 35 the signals can be transmitted through the selected gates, through the tie lines 42, 43, 44, 45 and 46 into the electronic data processing equipment whereat the information is used for further processing.

It should be noted that while they are only five plated wire elements shown in FIGURE 3 there could be any number of such plated wires and while there are only six drive straps shown there could be many, many more drive straps employed.

On the other hand, if a write operation is to be effected, the proper gate of the gates 37 is selected and the bi-directional write signal generator 40 is turned on to apply current to either of one of two directions to a selected one of the plated wire elements 31 through 35.

As is also apparent in FIGURE 3 there are shown six drive straps 47 through 52. It will be noted that the figure depicts a break 53, which as mentioned above, is meant to imply, graphically, that there could be many, many more drive straps. Although, as mentioned before, there is no similar graphic indication, there could be many, many more plated wire elements. On writing, all drive straps except the one under which a bit is to be written are energized, thus inhibiting the writing action at all locations except the selected one.

Consider that there is information stored on the magnetizable sheet 19 in the locations 54 through 58 which are defined by the intersection of the drive strap 47 and the plated wire elements 31 through 35. The memory locations actually will be on the magnetizable sheet 19, although their numbers are indicated on the drive strap 47 for purposes of discussion. Further assume that the EDP equipment 41 has transmitted a control signal on line 39 and on cable 59 indicating that the five gates corresponding to the plated wires 31 through 35 should be ready to pass information therefrom and indicating that the drive straps should effect a read out of the positions 54 through 58. The system will operate to transmit a drive strap current down only the drive strap 47, and a voltage pulse will be generated in each of the plated wires 31, 32, 33, 34, and 35 because of the reduction of the circumferential flux at the positions 54, 55, 56, 57 and 58. Now in accordance with the control signals, the signal transmitted down the drive strap 47 will be terminated, thereby restoring the flux linkage through the plated wire elements at each of the locations 54 through 58 and hence inducing voltage in an opposite polarity in each of the plated wires 31 through 35. Such an applied signal and induced signal relationship can be seen in FIGURE 8. These induced signals will be transmitted through the gates 37 through the electronic data processing equipment for amplification and further processing. Obviously the information as stored on the magnetizable sheet 19 located in the position 54 through 58 will consist of a plurality of zeros and ones representing some particular data character. It should be noted that this read-out was a non-destructive read-out. That is to say that the information after having been read out still remained on the magnetizable sheet 19 and could be read out over and over again in the manner just described.

It should be further understood that this system becomes a random access system in that any one of the drive straps can be selected. Further, if the memory is expanded by additional plated wire sets which are more in number than the bits of a word processed, only portions of the plated wires could be detected to simply read portions of information (a sufficient number of bits for a word) from the magnetizable sheet 19.

For the sake of discussion let us assume that the EDP equipment 41 has been programmed to write information into the locations 54 through 58. In this case control signals are sent along the cable 39 to open the gates which are intended to have ones written thereinto. Further control signals are sent from the EDP equipment 41 along the cable 59 to transmit drive strap current to the drive straps 48 through 52. The drive strap currents act to prevent the flux generated by the write currents from completing the respective paths and to keep such flux from causing a write-in of information in any positions other than the positions under drive strap 47.

In other words, let us suppose that there was drive current from the bi-directional write signal generator 40 through the proper gate 37 along the plated wire 31 to ground 60. This last mentioned drive current would attempt to cause a write-in of information in each of the positions 54, 61, 62, 63, 65. However, if the drive straps 48 through 52 are energized so that the vectors in the ferromagnetic material lying at the locations 61 through 65 are oriented axially to the plated wire 31, then the flux generated by the write current will not find a path through the ferromagnetic material to complete a linkage and hence the locations 61 through 65 of the magnetizable sheet will not have their dipoles oriented in accordance with the flux of the write current. On the other hand, the drive line 47 will not be energized and the write current flux will indeed orient the dipole under position 54 in accordance therewith.

During the second step of the operation, the gates 37 which are related to positions into which zeros are to be written will be opened and write current will be applied in the opposite direction by virtue of the bi-directional write signal generator 40 to effect write-in of information in the remaining positions. Once again of course during the second part of the operation the drive straps 48 through 52 will be energized to block writing information under these straps.

Figure 4:
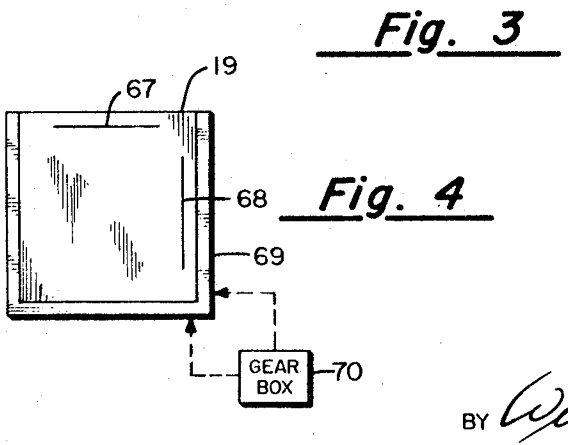
FIGURE 4 is a schematic of the magnetizable sheet showing the two location strips.

Now it becomes important that when the magnetizable sheet 19 is replaced or removed that the new sheet should be lined up precisely with its locations under the plated wire memories in order to be able to extract information from the sheet or write information thereinto. Many ways can be implemented, but a simple method is as follows: As can be seen in FIGURE 4, there are two guide strips 67 and 68. The guide strip 67 is a portion of the magnetizable sheet 19 which has been magnetized along a straight line. In a like manner the guide strip 68 is a portion of the sheet 19 which has been magnetized along a horizontal line. When the sheet 19 is located in the sheet holder 69 which is not depicted in FIGURE 3 and is shown as a heavy line in FIGURE 4, the sheet must be positioned for proper read out by the plated wires. In order to accomplish this the sheet holder 69 is manipulated by virtue of the gear box 70. The sheet holder can be automatically moved or manually moved. In the first part of the operation the sheet holder is moved vertically until the horizontal magnetized strip comes under the plated wire element 71. This can be determined by having the operator hit a control key on the location control box 72 which causes an A.C. signal to be applied to the drive strap 50. As the A.C. signal is applied to the drive strap 50 the operator moves the sheet 19 vertically and there will be an output signal from the plated wire element 71 when the strip 67 comes thereunder. This output will be seen on the display portion of the control box 72. Thereafter the operator hits a second control key which terminates the A.C. signal and causes drive straps 49, 50 and 51 to be sequentially pulsed. If the line 67 is sitting under the gap of the plated wire element 71 without any skew then three pulses will be seen on the display device. Obviously there could be more pulses for better skew control or the skew could be disregarded with a dependency upon an accurate mechanical arrangement.

Once the sheet 19 has been lined up along the vertical direction the operator switches the mechanical motion of the sheet holder 69 and through the gear box 70 manipulates the sheet 19 in a horizontal direction. As the sheet 19 is moved horizontally the control circuitry 72 is energized for the third time and an A.C. signal is applied to the strap 73. When the vertical control line 68 becomes located under the plated wire element 74 an A.C. signal will be seen on the display portion of the control box. Thereafter a fourth control signal is applied and the A.C. is terminated while the drive straps 76, 73 and 75 are sequentially subjected to pulses. If the vertical control strip is located under the groove of the plated wire element 74, without skew, then three pulses will be seen on the display device and the sheet 19 will be properly aligned for a read-out by the rest of the system.

Figure 5:
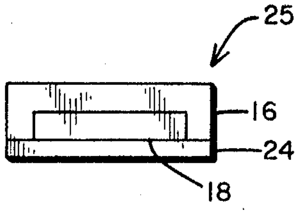
FIGURE 5 is an end view of a drive strap including the insulation strip.

FIGURE 5 depicts a drive strap used in the preferred embodiment. A copper core 18 is surrounded by a plated shield of ferromagnetic material. Accordingly the flux generated by an electrical current being passed along the core 18 is concentrated by the low inductance path of the ferromagnetic material 16. Under the drive strap there is shown the insulation strip 24. Other forms of drive straps could be used.

Figure 6:
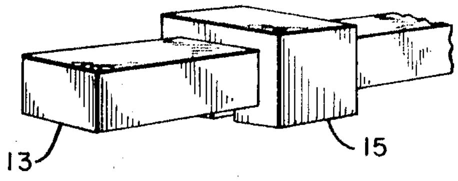
FIGURE 6 is a pictorial schematic of a segmented plated wire element.

FIGURE 6 shows a preferred embodiment of a plated wire element. The ferromagnetic material 15 is removed from the core 13 at predetermined intervals which match the distances between drive straps. Accordingly the flux from the drive strap effectively blocks erroneous information from being read. In other words when a "write-in" operation is effected, current is passed along the plated wire. The flux generated by the write current finds a low impedance path at areas which are not under the drive straps and hence erroneous information can be written between defined locations. This leads to cross talk problems. In addition the flux can skew from areas on either side of the drum strap to provide an effect even under the drive straps to cause an erroneous write-in. By removing the removing the ferromagnetic material so as to define the storage locations (FIGURE 6), the flux from the read current which may effect a data storage location is concentrated in the remaining section 15 and can be effectively blocked by the current of the drive strap. Hence a write-in can be accomplished with a minimum of problems.

Figure 7:
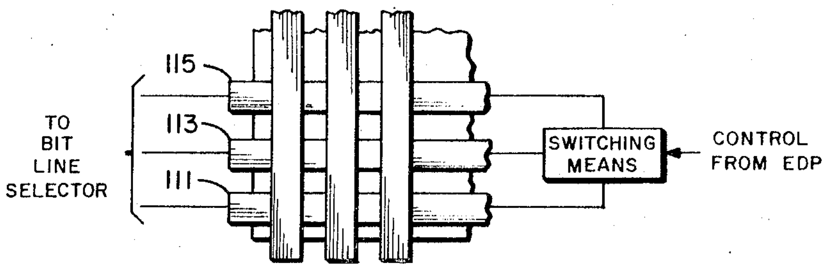
FIGURE 7 is a view of a segment of the system showing one implementation of the use of dummy lines for noise control.

In FIGURE 7 there is shown an arrangement to minimize the direct capacitive coupling from the word strap to the plated wires. Assume in FIGURE 7 that lines 113 and 115 are standard plated wire elements. There is also provided with such an arrangement a dummy wire 111. The dummy wire 111 is connected to the wire being read so that the noise signals generated by the capacitive coupling between a drive strap and a plated wire are cancelled by similar signals generated in the dummy wire. In the embodiment shown the dummy wire 111 is selectively connected to each of the significant plated wires 113 and 115, and others. In another arrangement there is provided a dummy wire for each plated wire.

The embodiments of the invention in which an exclusive property or privilege is claimed are defined as follows:

1. A data memory device having an interchangeable data storage medium arrangement comprising in combination:
   - (a) a plurality of wires each having material of high magnetic permeability secured thereto;
   - (b) said material of high magnetic permeability on each of said wires being formed with a gap therein to provide a plurality of magnetic read-write heads therealong;
   - (c) removable magnetizable-means disposed adjacent said plurality of wires and in close proximity to said gaps;
   - (d) a plurality of drive straps disposed in intersection relationship with said wires so as to define data storage locations on said removable magnetizable-means at said intersections of said drive straps and said wires; and
   - (e) circuitry means connected to said drive straps and said wires to selectively transmit electrical signals therealong to store information on said removable magnetizable-means and alternatively read information therefrom.

2. A data memory device according to claim 1 wherein said gap in said material of high magnetic permeability is a groove which is disposed along the axis of its associated wire.

3. A data memory device according to claim 1 wherein said wires are disposed in a parallel array and wherein said drive straps are disposed orthogonally thereto to form said intersections.

4. A data memory device according to claim 1 wherein said removable magnetizable-means comprises a sheet of magnetizable material.

5. A data memory device according to claim 4 wherein said sheet of magnetizable material comprises a substrate sheet upon which there is secured a layer of iron oxide.

6. A data memory device according to claim 1 wherein said removable magnetizable-means has a vertical positioning marker stored as data information along a horizontal position thereon.

7. A data memory device according to claim 1 wherein said removable magnetizable-means has a horizontal positioning marker stored as data information along a vertical position thereof.

8. A data memory device according to claim 1 wherein said removable magnetizable-means has a vertical positioning indicator stored as data information along a horizontal position thereof and a horizontal positioning indicator stored as data information along a vertical position thereof and wherein there is further included a first plated wire element disposed to read said vertical positioning indicator and a second plated wire element disposed to read said horizontal positioning indicator and wherein there is further included drive strap means with each of said last two mentioned plated wire elements disposed to form intersections therewith.

9. A data memory device according to claim 8 wherein there is further included circuitry means connected: (1) to said plated wire elements associated with said vertical positioning indicator and said drive strap associated therewith, (2) to said plated wire element associated with said horizontal positioning indicator and the plated wires associated therewith in order to effect a read-out of said indicators when said removable magnetizable-means is in its proper location.

10. A data memory device according to claim 9 wherein there is further included a holder means for holding said removable magnetizable means and mechanical locations means mechanically coupled to said holder means to position said removable magnetizable-means into a proper location.

11. A data memory device according to claim 1 wherein said material of high magnetic permeability is divided into portions which are discretely located along said associated wires and wherein said drive straps are disposed to intersect said wires at said discretely located high permeability material portions.

12. A data memory device according to claim 1 wherein said drive strap means comprise a substantially rectangular electrically conductive core memory and wherein each of said drive straps has three sides of said core member surrounded by material of high magnetic permeability and said fourth side is covered by an electrically insulating material.

References Cited

UNITED STATES PATENTS

| | | | |
|---|---|---|---|
| 3,142,048 | 7/1964 | Smith | 340—174 |
| 3,213,431 | 10/1965 | Kolk et al. | 340—174 |

OTHER REFERENCES

"Readback Head for High Density Recording," by Morrison et al. IBM Technical Disclosure Bulletin, vol. 9, No. 2, July 1966.

BERNARD KONICK, Primary Examiner

VINCENT P. CANNEY, Assistant Examiner

U.S. Cl. X.R.

340—174